United States Patent [19]

Wondrazek et al.

[11] Patent Number: 4,757,507
[45] Date of Patent: Jul. 12, 1988

[54] LASER WITH SWITCHABLE EMISSION WAVELENGTH

[75] Inventors: Fritz Wondrazek, Pfaffenhofen; Andreas Hahn, Sauerlach; Frank Frank, Ebersberg, all of Fed. Rep. of Germany

[73] Assignee: Messerscchmitt-Bölkow-Blohm GmbH, Munich, Fed. Rep. of Germany

[21] Appl. No.: 47,615

[22] Filed: May 8, 1987

[30] Foreign Application Priority Data

May 21, 1986 [DE] Fed. Rep. of Germany ....... 3617084

[51] Int. Cl.$^4$ ................................................ H01S 3/11
[52] U.S. Cl. ..................................... 372/23; 372/19; 372/20; 372/99; 372/107
[58] Field of Search ...................... 372/23, 99, 103, 98, 372/107, 15, 20, 24, 19, 9

[56] References Cited

U.S. PATENT DOCUMENTS

| 3,772,609 | 11/1973 | Willett et al. | 372/23 |
| 3,860,888 | 1/1975 | Stephens | 372/23 |
| 4,441,186 | 4/1984 | Erickson | 372/23 |

FOREIGN PATENT DOCUMENTS 2129201 5/1984 United Kingdom .................. 372/20

Primary Examiner—James W. Davie
Assistant Examiner—Xuan T. Vo
Attorney, Agent, or Firm—Kenyon & Kenyon

[57] ABSTRACT

For operating a laser at different wavelengths, at least one of the two mirrors of the oscillator is subdivided into two or more regions with different spectral reflectivity, where each region reflects only one of the emission wavelengths of the laser medium and is largely permeable for the remaining emission wavelengths. Each such region can be inserted separately into the ray path of the laser.

6 Claims, 1 Drawing Sheet

LASER WITH SWITCHABLE EMISSION WAVELENGTH

BACKGROUND OF THE INVENTION

The present invention relates to a laser with a laser medium which can be activated in at least two emission wavelengths, and which is arranged between two opposite plane-parallel and/or spherical mirrors and where one of the mirrors is partially permeable at at least one emission wavelength, and the other mirror totally reflects at least one of the emission wavelengths.

From the journal "Lasers and Applications", September 1984, pages 148ff, a neodymium-YAG laser is known, of which the emission wavelength can be switched between the values 1.06 $\mu$m and 1.32 $\mu$m. This is accomplished by means of optoelectronic means which are arranged between the laser medium and the totally reflecting mirror. The optoelectronic means consist essentially of a birefringent crystal and a Pockels cell. The "ordinary" ray of the birefringent crystal has the wavelength 1.06 $\mu$m and the "extraordinary" ray with the lower intensity has the wavelength 1.32 $\mu$m. By addressing the subsequent Pockels cell, the radiation is given a rotation of the direction of polarization of 45° for each passage, so that a total phase shift of 90° is brought about. Depending on the addressing, either the "ordinary" or the "extraordinary" ray can therefore travel through the birefringent crystal acting as a polarizer and for the respective other ray and therefore, for the respective other wavelength, the ray path remains blocked.

SUMMARY OF THE INVENTION

The above-mentioned device is relatively costly and, in addition, it reduces the efficiency of the laser not inconsiderably. It is therefore an object of the invention to provide a laser with a laser medium which can be activated in at least two emission wavelengths, which can be switched in a simple manner between the different emission wavelengths, and has high efficiency at the respective emission wavelengths.

The above and other objects of the present invention are achieved by a laser having a laser medium which can be activated in at least two emission wavelengths, the laser being arranged between two opposite mirrors, one of the mirrors being partially permeable at at least one emission wavelength, and the other mirror totally reflecting at least one of the emission wavelengths, at least one of the mirrors having at least two regions with different spectral reflectivity such that each region reflects only one of the emission wavelengths and is largely permeable for the remaining emission wavelength, each region adapted to be inserted separately into the ray path of the laser.

To particular advantage, the invention can be applied to a neodymium-YAG laser, the partially permeable mirror of which is plane-parallel and subdivided into two regions, of which the one region has high reflectivity at the wavelength $\lambda_1 = 1.06$ $\mu$m and the other has high reflectivity at the wavelength $\lambda_2 = 1.32$ $\mu$m. The reflectivity of the individual partial regions must be here so narrow-band that the respective other wavelength is no longer picked up; i.e., that the mirror region which reflects the wavelength $\lambda_1 = 1.06$ $\mu$m very largely passes the wavelength $\lambda_2 = 1.32$ $\mu$m, and vice versa.

BRIEF DESCRIPTION OF THE DRAWINGS

The invention will be explained in greater detail in the following detailed description with reference to the drawings, in which.

DETAILED DESCRIPTION

Figure 1:
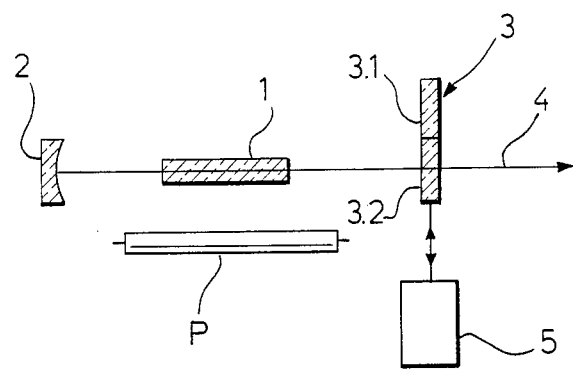
FIG. 1 shows the schematic design of a laser with two emission wavelengths.

With reference now to the drawings, FIG. 1 shows the design of a laser with a laser medium 1, for instance, a neodymium-YAG crystal which has two pronounced emission wavelengths at $\lambda_1 = 1.06$ $\mu$m and at $\lambda_2 = 1.32$ $\mu$m. The laser medium 1 is arranged in a manner known per se between two mirrors 2 and 3, of which the mirror 2 has spherical curvature 11 and has nearly 100% reflectivity at the wavelength $\lambda_1$ as well as at the wavelength $\lambda_2$. The laser medium is excited in the manner known per se by means of a pumping light source P.

The mirror 3 has two plane-parallel regions 3.1 and 3.2, of which always one can be inserted into the ray path 4 by means of a drive mechanism 5. The region 3.1 has a dielectric coating which reflects the wavelength $\lambda_1 = 1.06$ $\mu$m to a large degree and passes a small portion thereof for output-coupling of the laser beam. For the wavelength $\lambda_2 = 1.32$ $\mu$m, the region 3.1 is largely permeable so that vibration of the laser medium is avoided at this wavelength; the transmittivity should be at least 90% in this connection. The coating of the region 3.2 is correspondingly designed for oscillation at the wavelength $\lambda_2 = 1.32$ $\mu$m with a reflectivity which is relatively high at this wavelength and a correspondingly high transmittivity at the wavelength $\lambda_1 = 1.06$ m.

Figure 2:
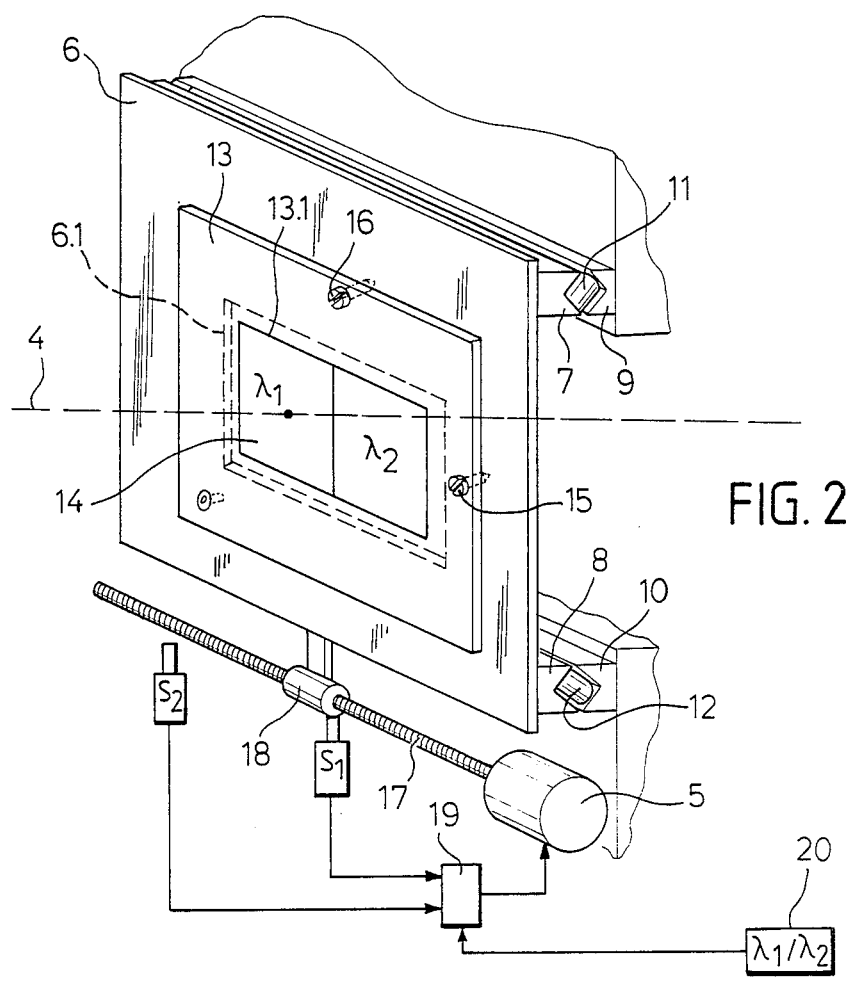
FIG. 2 shows a moveable partially permeable mirror with two regions having different spectral reflectivity.

FIG. 2 shows a design of a partially permeable mirror 14 which can be moved by means of a motor 5 with two regions of different spectral reflectivity. At a first frame 6 which is relatively stiff and unbendable, two guide rails 7 and 8 with precisely ground prismatic running surfaces are arranged, opposite which two corresponding rails 9 and 10 are arranged which are mounted in fixed relationship to the device. The rails 7, 9 and 8, 10, respectively, are based with respect to each other so that guidance without play is brought about by means of rolls 11 disposed in between. The frame 6 has an inner opening 6.1 which is covered by a second frame 13. The second frame 13 has a window opening 13.1 into which a plane-parallel glass plate 14 is inserted which has two regions, arranged horizontally side by side, with different spectral reflectivity for the wavelengths $\lambda_1$ and $\lambda_2$. The partially permeable mirror 14 designed in this manner is aligned by means of two setscrews 15 and 16 at the frame 13 exactly perpendicularly to the ray path 4. The change of the spectral reflectivity of the mirror 14 and thereby the switching of the laser to the respective other emission wavelength is accomplished by shifting the frame 6 by means of a motor 5, a threaded spindle 17 and a guiding sleeve 18 fastened to the frame. The end positions of the frame 6 are determined by two contact switches $S_1$ and $S_2$ which are actuated by the sleeve 18. The choice of the operating wavelength is made by means of a hand or foot switch 20 which, together with the switches $S_1$ and $S_2$ acts on a motor control unit 19 which controls starting and stopping as well as the direction of rotation of the motor 5.

It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A laser having a laser medium and a pumping means for exciting said laser medium, said laser medium being activated in at least two emission wavelengths, the laser medium being arranged between two opposite mirrors, one of the mirrors being partially permeable at at least one emission wavelength, and the other mirror totally reflecting at least one of the emission wavelengths, at least one of the mirrors having at least two regions with different spectral reflectivity such that each region reflects only one of the emission wavelengths and is largely permeable for the remaining emission wavelength, and further comprising means for inserting each region separately into the ray path of the laser, said at least one mirror having at least two regions with different spectral reflectivity comprising a plane parallel mirror having two said regions arranged side by side, said plane-parallel mirror being movable by said inserting means perpendicularly to the ray path of the laser.

2. The laser recited in claim 1, wherein one of the mirrors comprises one of a plane-parallel mirror or a spherical mirror.

3. The laser recited in claim 1, wherein the laser medium comprises a neodymium-YAG crystal and at least one of the mirrors has two regions, one of the regions having high narrow-band reflectivity at the wavelength $\lambda_1 = 1.06$ $\mu$m and the other region having high narrow-band reflectivity at the wavelength $\lambda_2 = 1.32$ $\mu$m.

4. The laser recited in claim 1 wherein the mirror with the regions with different spectral reflectivity is partially permeable for coupling-out the laser radiation.

5. The laser recited in claim 1, wherein the plane-parallel mirror is arranged on slide means movable by said inserting means perpendicularly to the ray path of the laser.

6. The laser recited in claim 5, wherein said slide means comprises precision guide means.

* * * * *